United States Patent
Chang et al.

(10) Patent No.: US 10,250,152 B2
(45) Date of Patent: *Apr. 2, 2019

(54) FORCED ZERO VOLTAGE SWITCHING FLYBACK CONVERTER

(71) Applicant: Alpha and Omega Semiconductor Incorporated, Sunnyvale, CA (US)

(72) Inventors: Kuang Ming Chang, Fremont, CA (US); Lin Chen, San Jose, CA (US); Qihong Huang, San Jose, CA (US)

(73) Assignee: Alpha and Omega Semiconductor Incorporated, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/971,629

(22) Filed: May 4, 2018

(65) Prior Publication Data
US 2018/0254712 A1 Sep. 6, 2018

Related U.S. Application Data

(63) Continuation of application No. 15/334,173, filed on Oct. 25, 2016, now Pat. No. 9,998,021.

(51) Int. Cl.
*H02M 3/335* (2006.01)
*H02M 1/08* (2006.01)
(Continued)

(52) U.S. Cl.
CPC ......... *H02M 3/33592* (2013.01); *H02M 1/08* (2013.01); *H02M 1/32* (2013.01);
(Continued)

(58) Field of Classification Search
CPC ..... H02M 3/33592; H02M 2001/0009; H02M 2007/4815; H02M 1/047; H02M 1/083; H02M 2001/0058
See application file for complete search history.

(56) References Cited

U.S. PATENT DOCUMENTS 5,206,800 A 4/1993 Smith
5,402,329 A 3/1995 Wittenbreder, Jr.
(Continued)

OTHER PUBLICATIONS

M. T. Zhang, M. M. Jovanovic and F. C. Lee, "Design considerations and performance evaluations of synchronous rectification in flyback converters," Applied Power Electronics Conference and Exposition, 1997, APEC '97 Conference Proceedings 1997., Twelfth Annual, Atlanta, GA, 1997, pp. 623-630 vol. 2.
(Continued)

*Primary Examiner* — Fred E Finch, III
*Assistant Examiner* — Rafael O De Leon Domenech
(74) *Attorney, Agent, or Firm* — Innovation Counsel LLP

(57) ABSTRACT

A flyback converter implements a Forced Zero Voltage Switching (ZVS) timing control by detecting a positive current excursion of the secondary winding current as the synchronous rectifier turn off trigger. The synchronous rectifier switch is turned on near the end of the switching cycle or the on duration is extended to develop a current ripple on the secondary winding current. The control circuit of the flyback converter detects a positive current excursion on the secondary winding current to turn off the synchronous rectifier and to start the next switching cycle. At this point, the voltage across the primary switch has been discharged and the primary switch can be turned on with zero drain-to-source voltage. In other embodiments, zero voltage switching for the off-transition of the primary switch is realized by coupling a capacitor across the primary switch or by coupling a capacitor across the primary winding, or both.

16 Claims, 10 Drawing Sheets

(51) Int. Cl.
  *H02M 1/32* (2007.01)
  *H02M 1/44* (2007.01)
  *H02M 1/00* (2006.01)
  *H02M 7/48* (2007.01)
  *H02M 1/04* (2006.01)

(52) U.S. Cl.
  CPC .............. *H02M 1/44* (2013.01); *H02M 1/047* (2013.01); *H02M 1/083* (2013.01); *H02M 2001/0009* (2013.01); *H02M 2001/0058* (2013.01); *H02M 2007/4815* (2013.01)

(56) References Cited

U.S. PATENT DOCUMENTS

| | | | |
|---|---|---|---|
| 5,757,626 A | 5/1998 | Jovanovic et al. | |
| 5,991,171 A | 11/1999 | Cheng | |
| 5,991,172 A * | 11/1999 | Jovanovic | H02M 1/4258 363/132 |
| 6,198,638 B1 | 3/2001 | Lee | |
| 7,876,584 B2 | 1/2011 | Havanur | |
| 9,899,931 B1 * | 2/2018 | Chang | H02M 3/33592 |
| 9,954,456 B2 * | 4/2018 | Xue | H02M 1/083 |
| 9,991,811 B1 * | 6/2018 | Song | H02M 1/083 |
| 9,998,021 B2 * | 6/2018 | Chang | H02M 3/33592 |
| 2006/0013022 A1 | 1/2006 | Jitaru | |
| 2015/0280573 A1 | 10/2015 | Gong et al. | |
| 2016/0099647 A1 * | 4/2016 | Zhang | H02M 3/33569 363/21.12 |
| 2016/0111961 A1 * | 4/2016 | Balakrishnan | H02M 3/33507 363/21.12 |
| 2016/0294292 A1 * | 10/2016 | Huang | H02M 1/44 |
| 2016/0329819 A1 | 11/2016 | Chen et al. | |

OTHER PUBLICATIONS

A. M. Connaughton, K Krischan, K. K. Leong and A. Muetze, "New control concept for soft-switching Flyback converters with very high switching frequency," 2016 IEEE Applied Power Electronics Conference and Exposition (APEC), Long Beach, CA, USA, 2016, pp. 355-361.

* cited by examiner

FORCED ZERO VOLTAGE SWITCHING FLYBACK CONVERTER

CROSS REFERENCE TO OTHER APPLICATIONS

This application is a continuation of U.S. patent application Ser. No. 15/334,173, entitled FORCED ZERO VOLTAGE SWITCHING FLYBACK CONVERTER, filed Oct. 25, 2016, now U.S. Pat. No. 9,998,021, issued Jun. 12, 2018, which is incorporated herein by reference for all purposes.

BACKGROUND OF THE INVENTION

The flyback converter is an isolated power converter that is commonly used in both AC-to-DC and DC-to-DC conversion with galvanic isolation between the input and the one or more outputs. More specifically, the flyback converter is a buck-boost converter with the inductor split to form a transformer, so that the voltage ratios are multiplied with an additional advantage of isolation. Synchronous rectification is often applied to replace the diode rectifier to improve efficiency. FIG. 1 is an example of a flyback converter using synchronous rectification. As shown in FIG. 1, a typical construction of the flyback converter includes a primary switch (SW) coupled to the primary transformer winding of a transformer Lm and a synchronous rectifier switch (SR) coupled to the secondary transformer winding of the transformer Lm. The input voltage $V_{IN}$ is provided across the primary winding and the primary switch. The primary switch is controlled by a control voltage $V_{GS}$ to turn on and off to conduct a primary current Ipri. The primary switch and the synchronous rectifier are complementary in operation with one switch being turned on while the other switch is turned off. The conduction periods of the primary switch SW and the synchronous rectifier SR do not overlap. The current flowing on the secondary side, referred to as the secondary current Isec, charges an output capacitor C3 to provide the output voltage Vo. In some cases, active clamping may be implemented at the primary side to clamp the voltage at the drain terminal of the primary switch SW when the primary switch SW is turned off.

FIG. 2 illustrates exemplary signals waveforms for operating the flyback converter of FIG. 1 in a constant frequency, continuous-conduction-mode (CF CCM). FIG. 3 illustrates exemplary signals waveforms for operating the flyback converter of FIG. 1 in a constant frequency, discontinuous-conduction-mode (CF DCM). The flyback converter of FIG. 1 and the operation modes of FIGS. 2 and 3 are described in detail in the paper by M. T. Zhang, M. M. Jovanovic and F. C. Lee, "Design considerations and performance evaluations of synchronous rectification in flyback converters," *Applied Power Electronics Conference and Exposition,* 1997, *APEC '97 Conference Proceedings* 1997, pp. 623-630 vol. 2. In short, when operated in the CCM operation mode, the secondary current Isec does not go to zero current value before the start of the next switching cycle (primary switch SW turns on), as shown in FIG. 2. On the other hand, when operated in the DCM operation mode, the secondary current Isec go to zero current value before the start of the next switching cycle, as shown in FIG. 3.

Flyback converters suffer from power losses when switching transitions occur with non-zero voltages across the power switches. Zero voltage switching (ZVS) has been implemented in flyback converters to accomplish switching at zero voltage so as to achieve high efficiencies. Various techniques for implementing zero voltage switching have been described. For example, the Zhang paper describes a variable frequency (VF) ZVS DCM operation mode that can be implemented in the flyback converter of FIG. 1. FIG. 4 duplicates FIG. 5 of the Zhang paper and illustrates exemplary signals waveforms for operating the flyback converter of FIG. 1 in a VF ZVS DCM operation mode. In particular, to achieve ZVS at the primary switch, the conduction period of the synchronous rectifier (SR) is extended, or the turn off time of the synchronous rectifier is delayed by a time period $T_{delay}$ after the secondary current Isec has already reached zero current value. The extended on time $T_{delay}$ is used to allow a negative secondary current to build up on the secondary transformer winding, as indicated by current $I_{ZVS}$ in FIG. 4. As long as the energy stored in the magnetizing inductance Lm by the negative secondary current $I_{ZVS}$ is sufficient to discharge the primary switch parasitic capacitance (denoted by C1 in FIG. 1) down to zero voltage, ZVS can be achieved in the flyback converter. However, with the use of the extended SR conduction period, the switching frequency of the flyback converter becomes variable as a function of the load regulation. Variable frequency operation is undesirable, especially when avoidance of electromagnetic interference (EMI) disturbance is important.

BRIEF DESCRIPTION OF THE DRAWINGS

Various embodiments of the invention are disclosed in the following detailed description and the accompanying drawings.

DETAILED DESCRIPTION

Figure 1:
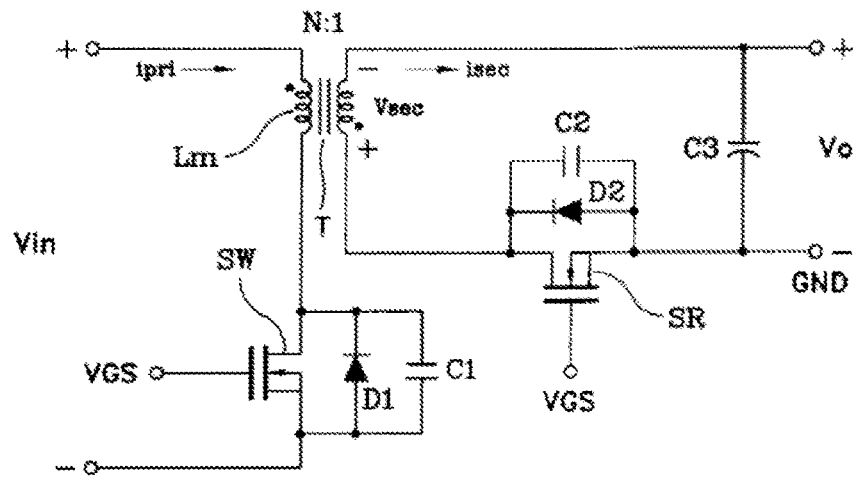
FIG. 1 is an example of a flyback converter using synchronous rectification.
Figure 2:
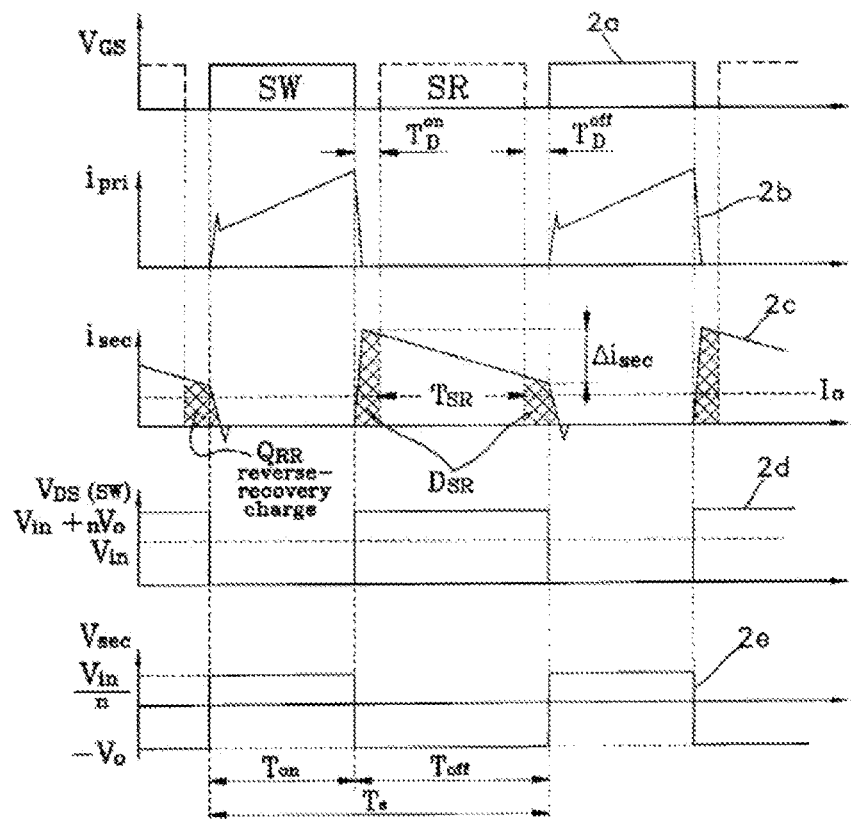
FIG. 2 illustrates exemplary signals waveforms for operating the flyback converter of FIG. 1 in a constant frequency, continuous-conduction-mode (CF CCM).
Figure 3:
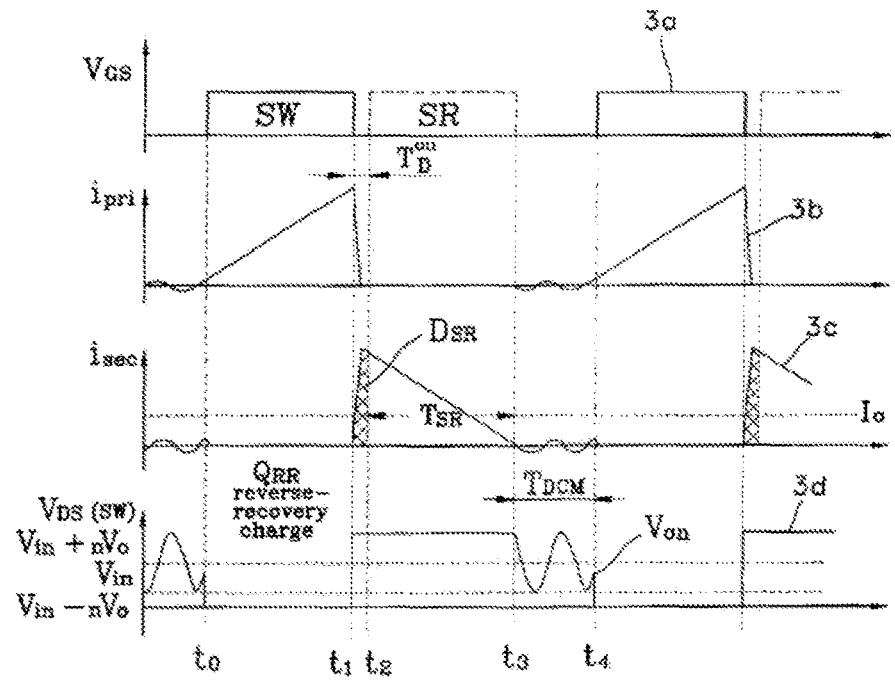
FIG. 3 illustrates exemplary signals waveforms for operating the flyback converter of FIG. 1 in a constant frequency, discontinuous-conduction-mode (CF CCM).
Figure 4:
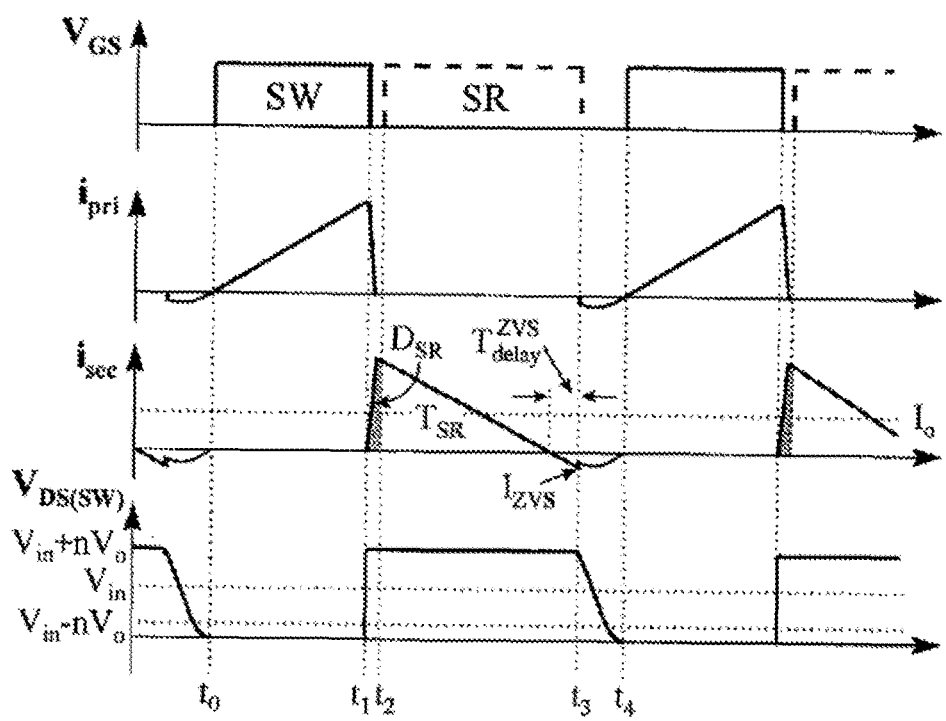
FIG. 4 duplicates FIG. 5 of the Zhang paper and illustrates exemplary signals waveforms for operating the flyback converter of FIG. 1 in a VF ZVS DCM operation mode.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a flyback converter implements a Forced Zero Voltage Switching (ZVS) timing control by detecting a positive current excursion of the secondary winding current as the synchronous rectifier turn off trigger. The flyback converter can be operated in the discontinuous conduction mode (DCM) or the critical conduction mode (CRI). In the DCM mode, the synchronous rectifier switch, having been turned off based on load regulation, is turned back on near the end of the switching cycle to develop a current ripple on the secondary winding current. In the CRI mode, the on-duration of the synchronous rectifier switch is extended after the secondary winding current zero crossing to develop a current ripple on the secondary winding current. The current ripple on the secondary winding current includes negative current excursions and positive current excursions. The control circuit of the flyback converter detects a positive current excursion on the secondary winding current ripple as a trigger to turn off the synchronous rectifier and to start the next switching cycle. At this point, the voltage across the primary switch has been discharged and the primary switch can be turned on with zero drain-to-source voltage, thereby avoiding switching loss.

The Forced ZVS flyback converter of the present invention realizes many advantages over conventional operation schemes. In particular, with the use of the positive secondary winding current as the synchronous rectifier turn off trigger, the flyback converter can operate in a fixed frequency or constant frequency discontinuous conduction mode (CF DCM) to eliminate EMI concerns. In one example, the on-time of the synchronous rectifier is modulated for load regulation while the switching frequency is kept constant. Furthermore, the flyback converter realizes improved efficiency by ensuring primary switch switching occurs at zero voltage.

Figure 5:
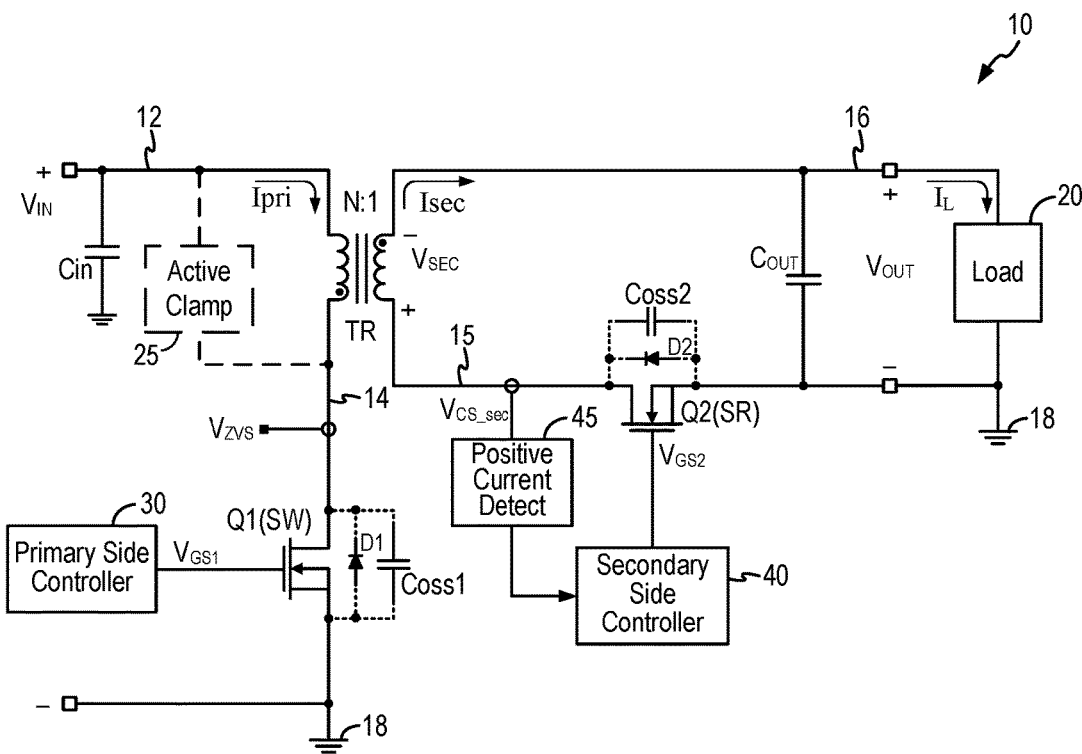
FIG. 5 is a schematic diagram of a flyback converter implementing Forced Zero Voltage Switching (ZVS) timing control in embodiments of the present invention.

FIG. 5 is a schematic diagram of a flyback converter implementing Forced Zero Voltage Switching (ZVS) timing control in embodiments of the present invention. Referring to FIG. 5, a flyback converter 10 includes a primary switch Q1 (SW) coupled to the primary transformer winding of a transformer TR and a synchronous rectifier switch Q2 (SR) coupled to the secondary transformer winding of the transformer TR. The input voltage $V_{IN}$ is coupled across the primary winding and the primary switch, between the input voltage node 12 and the ground node 18. An input decoupling capacitor Cin may be coupled to the input voltage node 12. The primary switch is controlled by a control voltage $V_{GS1}$ to turn on and off to conduct a primary current Ipri flowing in the primary transformer winding. The synchronous rectifier switch is controlled by a control voltage $V_{GS2}$ to turn on and off to conduct a secondary current Isec flowing in the secondary transformer winding. In the present description, the term "primary current" refers to the current flowing in the primary transformer winding and the terms "secondary current" and "secondary winding current" are both used to refer to the current flowing in the secondary transformer winding of the transformer TR. An output capacitor $C_{OUT}$ is coupled across the secondary winding and the synchronous rectifier, that is, between the output node 16 and the ground node 18. An output voltage $V_{OUT}$ is generated at the output node 16 to drive a load 20. In some embodiments, an active clamping circuit 25 may be provided at the primary side to clamp the voltage at the drain terminal (node 14) of the primary switch Q1 when the primary switch Q1 is turned off.

In embodiments of the present invention, the primary switch Q1 and the synchronous rectifier Q2 are power switches, typically MOSFET devices. In the present embodiment, both the primary switch Q1 and the synchronous rectifier Q2 are constructed using NMOS transistors. The NMOS transistor of primary switch Q1 has a drain terminal coupled to the transformer (node 14), a source terminal coupled to ground (node 18) and a gate terminal driven by the control voltage $V_{GS1}$. As an NMOS transistor, the primary switch Q1 also has associated parasitic capacitance Coss1 across the drain and source terminal of the transistor. The NMOS transistor of the primary switch Q1 also has a parasitic body diode D1 across the drain and source terminal of the transistor. In the present illustration, the parasitic capacitance Coss1 and the body diode D1 are shown as being connected in dotted lines across NMOS switch Q1 to indicate that the capacitance Coss1 is not an added capacitor element coupled to the NMOS transistor but rather is a parasitic capacitance formed as part of the NMOS transistor structure and the body diode D1 is a parasitic diode only and not an added diode element. At the secondary side, the NMOS transistor of synchronous rectifier switch Q2 has a drain terminal coupled to the transformer (node 15), a source terminal coupled to ground (node 18) and a gate terminal driven by the control voltage $V_{GS2}$. As an NMOS transistor, the synchronous rectifier switch Q2 has associated parasitic capacitance Coss2 and a parasitic body diode D2 both across the drain and source terminal of the transistor. Again, the parasitic capacitance Coss2 and the body diode D2 are shown as being connected in dotted line across NMOS switch Q1 to indicate that the capacitance Coss2 and the diode D2 are elements being coupled to the NMOS transistor but rather are parasitic elements formed as part of the NMOS transistor structure.

The primary switch and the synchronous rectifier are each driven by respective controller circuits to control the on and off operations of the switches. Specifically, a primary side controller 30 is coupled to drive the gate terminal of the primary switch Q1 and a secondary side controller 40 is coupled to drive the gate terminal of the synchronous rectifier Q2. The primary side controller 30 and the secondary side controller 40 can be constructed in various manner based on the control scheme selected for the flyback converter 10. In other words, the flyback converter 10 is a power stage and different control schemes can be used to control the flyback converter power stage. In operation, the switching of the primary switch is synchronized to the switching of the synchronous rectifier. In most implementations, either the primary side controller is the master controller with the secondary side controller is the slave or the secondary side controller is the master controller with the primary side controller is the slave. The master controller is usually implemented as a PWM controller. Examples of control schemes that can be used in the flyback converter 10 includes voltage mode control, peak current mode control and input voltage feedforward control. Each of the control schemes uses different feedback signals to control maintain a constant output voltage and to provide load regulation. The specific implementation of the control schemes in the flyback converter 10 is not critical to the practice of the present invention. One of ordinary skill in the art would appreciate that the Forced ZVS timing control can be applied in any of the control schemes to enable zero voltage switching at the primary switch for eliminating switching loss. In the present illustration, a primary side controller and a secondary side controller are provided. In other embodiments, the primary side controller and a secondary side controller can be constructed as a single controller or control circuit generating the control signals for the primary switch and the synchronous rectifier switch.

In embodiments of the present invention, the flyback converter power stage implements a constant on-time (COT) control scheme in the primary side controller with the secondary side being the master controller. The secondary side controller is a PWM controller configured to regulate the output voltage $V_{OUT}$. Under the COT control scheme, the primary switch is turned on for a fixed on duration. Then, the off duration of the primary switch is not fixed but rather is controlled by the secondary side controller by sensing the output voltage. Under the COT control scheme, the flyback converter may be operated in the discontinuous conduction mode with variable switching frequency. The secondary side controller implements the Forced ZVS timing control in accordance with the present invention to turn on the synchronous rectifier for a brief period to discharge the drain voltage at the primary switch and to turn off the synchronous rectifier when a positive secondary current excursion is detected. In some embodiments, the primary side controller implements auto synchronization where the primary controller detects a current signal on the primary side indicative of the synchronous rectifier being turned off and uses the detected current signal to initiate the next switching cycle by turning the primary switch on.

In embodiments of the present invention, the secondary side controller 40 implements the Forced ZVS timing control by monitoring the secondary current flowing through the synchronous rectifier Q2. The secondary current can be sensed using various current sense techniques to generate a current sense signal $V_{CS\_sec}$ indicative of the current flowing through the synchronous rectifier Q2. For example, the secondary current can be sensed at node 15. For example, the secondary winding current can be sensed using a series resistor or through an auxiliary winding on the secondary winding. A positive current detect circuit 45 is coupled to receive the current sense signal $V_{CS\_sec}$ and to detect a positive current excursion on the secondary current ripple as the trigger to turn off the synchronous rectifier Q2, as will be explained in more detail below.

Figure 6:
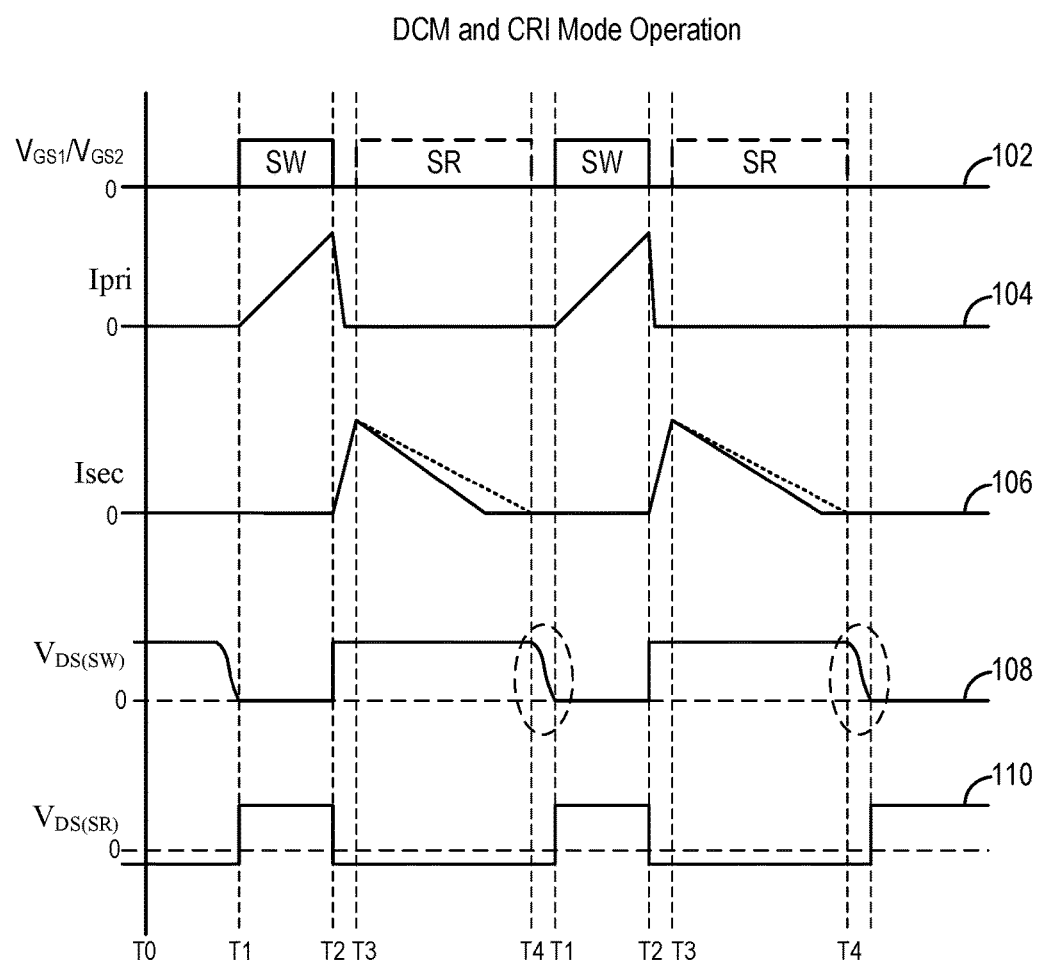
FIG. 6 is timing diagram illustrating the general operation of the Forced ZVS operation mode in some examples.

The general operation of the flyback converter 10 will now be described with reference to the timing diagram of FIG. 6. Referring to FIG. 6, the flyback converter 10 can be controlled using various control schemes described above. Regardless of the control scheme being used, the primary switch SW and the synchronous rectifier SR are complementary in operation with one switch being turned on while the other switch is turned off (curve 102). The conduction periods of the primary switch SW and the synchronous rectifier SR do not overlap. When the primary switch SW is turned on, the primary winding of the transformer TR is connected to the input voltage $V_{IN}$ and the primary current Ipri (curve 104) increases linearly as the magnetic flux in the transformer increases. Energy is stored in the transformer TR. At this time, the voltage $V_{SEC}$ induced in the secondary winding has a reverse polarity relative to the primary winding to cause the body diode D2 of the synchronous rectifier SR to be reversed biased. No secondary current Isec (curve 106) flows and the charge stored on the output capacitor $C_{OUT}$ supplies the load 20. With the primary switch SW turned on, the drain-to-source voltage $V_{DS(SW)}$ (curve 108) of the primary switch SW, at node 14, is at or near zero volts. Meanwhile, the secondary voltage $V_{SEC}$ (curve 110) of the synchronous rectifier SR (node 15), which is also the drain-to-source voltage $V_{DS(SR)}$ of the synchronous rectifier, is driven to a positive voltage being a ratio of the input voltage $V_{IN}$.

After the on period of the primary switch expires, the primary switch is turned off and the synchronous rectifier is turned on after a non-overlapping period. When the primary switch is turned off, the primary current Ipri decreases and the magnetic flux drops. The voltage across the secondary winding reverses so that the secondary voltage has a positive polarity at the dotted terminal, or negative polarity at the drain of the synchronous rectifier (node 15), to cause the body diode D2 of the synchronous rectifier SR to be become forward biased. As a result, current flows through the secondary winding as the secondary current Isec. The secondary current Isec increases to a peak current value. The synchronous rectifier SR is turned on after the non-overlapping period to conduct the secondary current Isec and to aid in the transfer of the stored energy from the transformer core to the output capacitor $C_{OUT}$. The output capacitor $C_{OUT}$ is recharged and supplies the load 20. The output voltage $V_{OUT}$ (node 16) is sustained by the charge on the output capacitor $C_{OUT}$. When the primary switch SW is turned off, the drain-to-source voltage $V_{DS(SW)}$ of the primary switch SW (node 14) swings to a high voltage value. In some examples, a voltage clamping circuit, such as the active clamp circuit 25, is used to clamp the drain voltage at the primary switch to a maximum allowable voltage value to protect the primary switch.

The control scheme being implemented in the flyback converter includes a feedback control loop to monitor the output voltage $V_{OUT}$. The control scheme being applied controls the on-time of the synchronous rectifier or the off-time of the primary switch to maintain the output voltage at the desired voltage value over various load conditions. At a prescribed time, the primary side or secondary side controller of the flyback converter initiates the next switching cycle by turning off the synchronous rectifier and turning on the primary switch. The operation described above repeats.

In the above description, the flyback converter is operated in the DCM mode where the secondary current goes to zero current value during the switching cycle. In other embodiments, the flyback converter can be operated in a critical current mode or critical conduction mode (CRI). Under the critical current mode, the synchronous rectifier on-duration ends in response to the secondary current Isec decreasing to zero current value, as shown by the dotted line for curve 106 in FIG. 6. In practice, the zero crossing of the secondary current Isec is detected and the Isec zero crossing detection is used to terminate the synchronous rectifier on duration. The Forced ZVS timing control of the present invention can be applied in flyback converters implementing either discontinuous conduction mode or critical conduction mode, as will be described in more detail below.

At the start of each switching cycle when the primary switch is to be turned on, the drain voltage at the primary switch is at a high voltage value. When the primary switch turns on with this high drain voltage, the flyback converter suffers from undesirable power loss. Therefore, zero voltage switching (ZVS) is implemented in flyback converters to cause switching transitions to occur at zero drain voltage to achieve high efficiencies. Various schemes have been developed in the arts to realize ZVS. FIG. 6 illustrates the result of implementing ZVS in the flyback converter 10. Specifically, when ZVS is implemented, the drain-to-source voltage $V_{DS(SW)}$ of the primary switch SW (curve 108) is brought down to zero volt before the primary switch SW is turned on, as shown by the dotted circles in FIG. 6. In this manner, power loss at the primary switch during switching transition is avoided.

Figure 7:
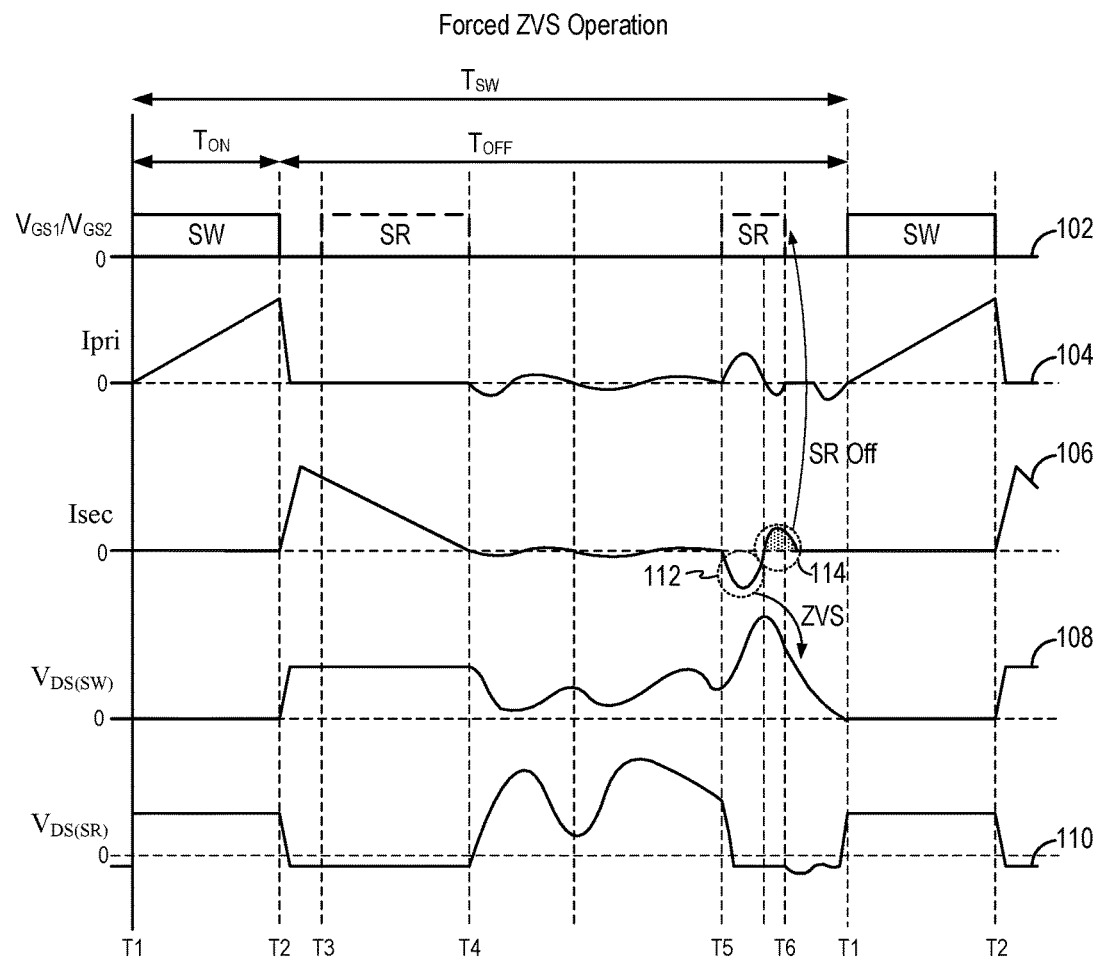
FIG. 7 is timing diagram illustrating signal waveforms of the flyback converter operating in the Forced ZVS timing control with positive current synchronous rectifier turn off trigger in embodiments of the present invention.

In embodiments of the present invention, the flyback converter 10 implements a Forced Zero Voltage Switching (ZVS) timing control by detecting a positive current excursion of the secondary current as the synchronous rectifier turn off trigger. FIG. 7 is timing diagram illustrating signal waveforms of the flyback converter operating in the Forced ZVS timing control with positive current synchronous rectifier turn off trigger in embodiments of the present invention. Referring to FIG. 7, the flyback converter 10 is operated in a discontinuous conduction mode (DCM) with the primary switch being turned on for a given on duration $T_{ON}$ and being turned off for a given off duration $T_{OFF}$. In DCM mode, a fixed frequency operation can be implemented. The switching frequency can be fixed with a fixed switching period $T_{SW}$. The flyback converter 10 can be controlled using various control schemes to maintain the output voltage and load regulation. Regardless of the control scheme being used, the primary switch SW and the synchronous rectifier SR are complementary in operation with one switch being turned on while the other switch is turned off (curve 102). The conduction periods of the primary switch SW and the synchronous rectifier SR do not overlap.

At the start of a switching cycle (T1), the primary switch SW is turned on for the on period $T_{ON}$. The primary current Ipri builds up (curve 104) and energy is stored in the transformer TR. Meanwhile, no secondary current Isec flows (curve 106) and the charge stored on the output capacitor $C_{OUT}$ supplies the load 20. The drain-to-source voltage $V_{DS(SW)}$ (curve 108) of the primary switch SW, at node 14, is at or near zero volts. Meanwhile, the secondary voltage $V_{SEC}$ (curve 110) of the synchronous rectifier SR (node 15), which is also the drain-to-source voltage $V_{DS(SR)}$ of the synchronous rectifier, is driven to a voltage being a ratio of the input voltage $V_{IN}$.

After the on period $T_{ON}$ of the primary switch expires (T2), the primary switch SW is turned off and the synchronous rectifier is turned on after a non-overlapping period (T2 to T3). When the primary switch is turned off, the primary current Ipri decreases and the magnetic flux drops. The voltage across the secondary winding reverses so that the secondary voltage Vsec has a positive polarity at the dotted terminal, or negative polarity at the drain of the synchronous rectifier (node 15). The negative polarity of the voltage Vsec causes the body diode D2 of the synchronous rectifier SR to be become forward biased and current flows through the secondary winding as the secondary current Isec. The secondary current Isec increases to a peak current value. At the end of the non-overlapping period (T3), the synchronous rectifier SR is turned on to conduct the secondary current Isec and to aid in the transfer of the stored energy from the transformer core to the output capacitor $C_{OUT}$. The output capacitor $C_{OUT}$ is recharged and supplies the load 20. The output voltage $V_{OUT}$ (node 16) is sustained by the charge on the output capacitor $C_{OUT}$. When the primary switch SW is turned off, the drain-to-source voltage $V_{DS(SW)}$ of the primary switch SW (node 14) swings to a high voltage value which may be clamped by a voltage clamping circuit to protect the primary switch SW.

The control scheme implemented in the flyback converter includes a feedback control loop to monitor the output voltage $V_{OUT}$. The control scheme being applied controls the on-time of the synchronous rectifier or the off-time of the primary switch to maintain the output voltage at the desired voltage value over various load conditions. At a prescribed time, the primary side or secondary side controller of the flyback converter initiates the next switching cycle by turning off the synchronous rectifier and turning on the primary switch. In particular, under DCM operation mode, the secondary current Isec decreases to zero value (T4) before the end of the switching period $T_{SW}$. The synchronous rectifier SR is turned off (T4) and the flyback converter 10 operates both the primary switch SW and the synchronous rectifier SR turned off (T4 to T5). During this period, the drain voltage $V_{DS(SW)}$ of the primary switch fluctuates and the secondary voltage $V_{SEC}$ or the drain voltage $V_{DS(SR)}$ of the synchronous rectifier switch also fluctuates.

In embodiments of the present invention, the Forced ZVS timing control is implemented to turn the synchronous rectifier SR back on near the end of the switching cycle. With the flyback converter operating in fixed frequency DCM, the end of each switching cycle is deterministic and the Forced ZVS timing control can be configured to insert a brief on-duration of the synchronous rectifier before the end of each switching cycle. Accordingly, at time T5, the Forced ZVS timing control operates to turn the synchronous rectifier SR back on for a short duration (T5-T6). The synchronous rectifier SR is turned back on ("the second on-duration") to induce a negative current ripple in the secondary current. The negative current ripple in the secondary current causes resonance energy to be built up in the transformer TR where the energy is used to drive down the drain voltage on the primary switch.

In particular, when the synchronous rectifier is turned backed on for the second on-duration when the secondary current has reached zero current value, a negative current with current ripple is developed on the secondary current Isec as a result of the parasitic capacitance on the synchronous rectifier and the primary switch. Referring back to FIG. 5, the parasitic capacitance Coss1 across the primary switch Q1 and the parasitic capacitance Coss2 across the synchronous rectifier switch Q2 are electrically in parallel. The parallel combination of the parasitic capacitance Coss1 and Coss2 (Coss1||Coss2) causes the negative current ripple on the secondary current Isec, as shown curve 106 of FIG. 7.

When the synchronous rectifier SR is turned back on during the second on-duration, the secondary current Isec becomes negative and negative energy is stored on the secondary winding. The negative energy stored on the transformer is transferred to the primary winding which causes a current to flow in the primary switch and thereby driving the drain-to-source voltage of the primary switch to zero voltage. In some example, the induced current flows through the parasitic body diode of the primary switch to discharge the total capacitance at the primary switch, thereby bringing the drain voltage to zero volts.

In the Forced ZVS timing control, the time duration to keep the synchronous rectifier SR on determines the amount of energy developed for ZVS. However, it is undesirable to keep the second on-duration of the synchronous rectifier SR for too long as it may limit the switching frequency of the flyback converter. Conventional ZVS methods may detect the primary switch drain voltage and turn off the synchronous rectifier SR when the primary switch drain voltage is at or below zero voltage. However, such methods often require the use of high voltage components to sense the primary switch drain voltage and thus the implementations are often costly and impractical.

Under the Forced ZVS timing control of the present invention, the negative current ripple developed on the secondary current is allowed to resonate until the resonating current ripple develops into a positive current excursion. More specifically, when the synchronous rectifier SR is turned on at time T5, the secondary current Isec is driven to negative current values, denoted by the dotted circle 112. The energy in the transformer resulted from the negative current values is used to drive the drain voltage $V_{DS(SW)}$ of the primary switch down to zero voltage. Meanwhile, the secondary current Isec resonates due to the parasitic capacitances Coss1 and Coss2 and a current ripple or ringing is developed on the secondary current. The magnitude of the current ripple or the ringing is large enough to cause the secondary current to resonate back into positive current values, as denoted by the dotted circle 114. Under the Forced ZVS timing control of the present invention, the positive current excursion of the secondary current is detected and used to trigger the turning off of the synchronous rectifier SR. The secondary current remaining after the synchronous rectifier SR is turned off will be conducted by the body diode of the synchronous rectifier.

More specifically, the Forced ZVS timing of the present invention turns on the synchronous rectifier for a second on-duration near the end of the switching cycle. The secondary current resonates due to the parasitic capacitances Coss1 and Coss2 of the primary switch and the synchronous rectifier switch. The secondary current develops a negative current with current ripples. The current ripple on the secondary current includes negative current excursions and positive current excursions. The negative current excursion is used to provide the energy for driving the primary switch drain voltage to zero for zero voltage switching. The positive current excursion is used as a trigger to turn off the synchronous rectifier. With the synchronous rectifier turned off, the controller circuit waits for the expiration of the off period $T_{OFF}$ and initiates the next switching cycle by turning on the primary switch with the drain-to-source voltage of the primary switch at zero voltage. The operation described above repeats.

In the Forced ZVS timing control of the present invention, the second on-duration of the synchronous rectifier is not fixed, rather the second on-duration is determined by the current ripple on the secondary current and a positive current excursion on the secondary current is used as the trigger to turn off the synchronous rectifier. The implementation of the Forced ZVS timing control of the present invention is advantageous in that high voltage components are not needed to sense the drain voltage at the primary switch. Instead, the secondary side controller senses the secondary current to detect for the positive current excursion to trigger the end of the second on-duration of the synchronous rectifier. In some embodiments, as shown in FIG. 5, the flyback converter 10 includes a current sense circuit configured to sense the secondary current (not shown) and a positive current detect circuit 45 configured to generate a signal indicating the detection of a positive current excursion during the second on-duration. The detection signal generated by the positive current detect circuit 45 can be provided to the secondary side controller 40 to generate the control signal $V_{GS2}$ to turn off the synchronous rectifier. In some embodiments, the positive current detect circuit 45 can be implemented as a comparator comparing a signal indicative of the sensed secondary current to a reference signal to detect for a positive current value. For example, the sensed secondary current can be converted to a voltage value $V_{CS\_sec}$ which is compared to a reference voltage to detect for a positive current value.

FIG. 7 illustrates the implementation of the Forced ZVS timing control for the flyback converter operating in a fixed frequency discontinuous conduction mode. As described above, the Forced ZVS timing control can also be implemented in a flyback converter operating in a variable frequency critical conduction mode. In the critical conduction mode, the synchronous rectifier off time is determined by the zero-crossing detection of the secondary current. When the secondary current is detected to have crossed the zero current value point, the secondary side controller would have generated the control signal to turn the synchronous rectifier off. However, when the Forced ZVS timing control is implemented, the synchronous rectifier is not turned off at the zero current crossing of the secondary current but rather is extended for a brief duration. The extended on-duration operates in the same manner as the second on-duration described above in the DCM mode where a negative current with current ripple is developed on the secondary current and a positive current excursion on the secondary current is used as the trigger to turn off the synchronous rectifier. In the present description, the extended on-duration in the critical conduction mode and the second on-duration in the discontinuous conduction mode referred to the same duration at which the synchronous rectifier is turned on when the secondary current has reached zero current value.

Figure 8A:
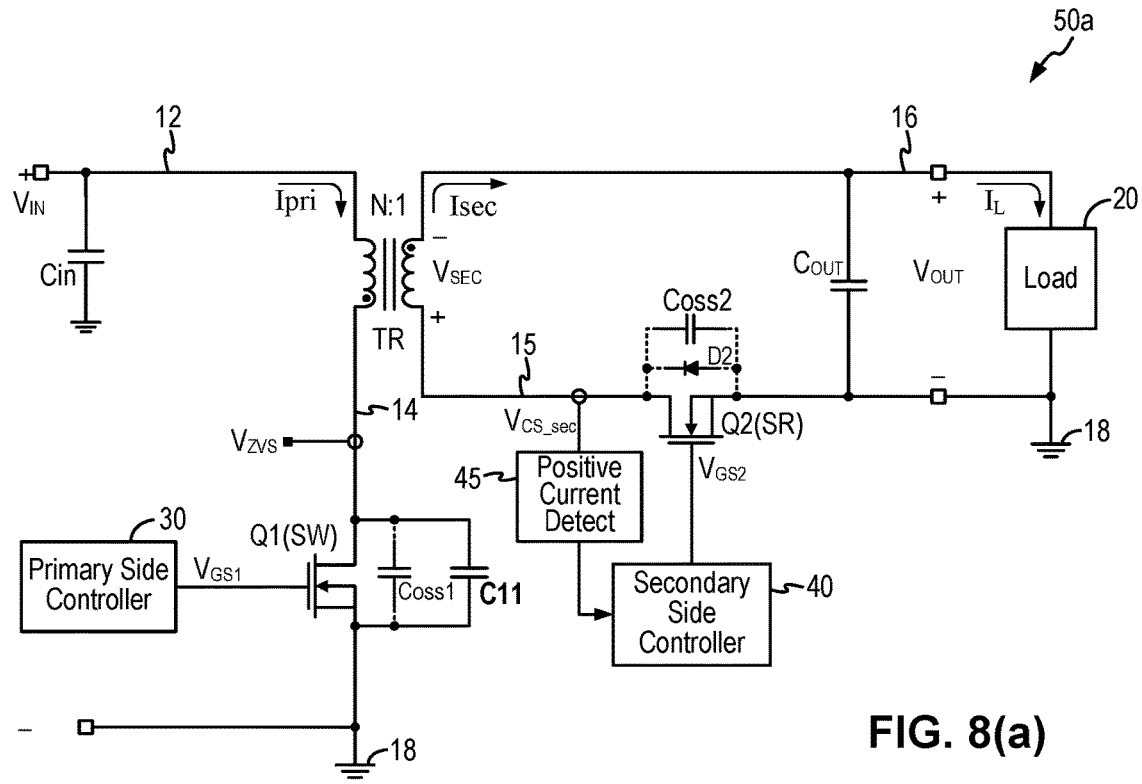
FIGS. 8(a) to 8(c) are schematic diagrams of flyback converters implementing Forced Zero Voltage Switching (ZVS) timing control for the primary switch in alternate embodiments of the present invention.
Figure 8B:
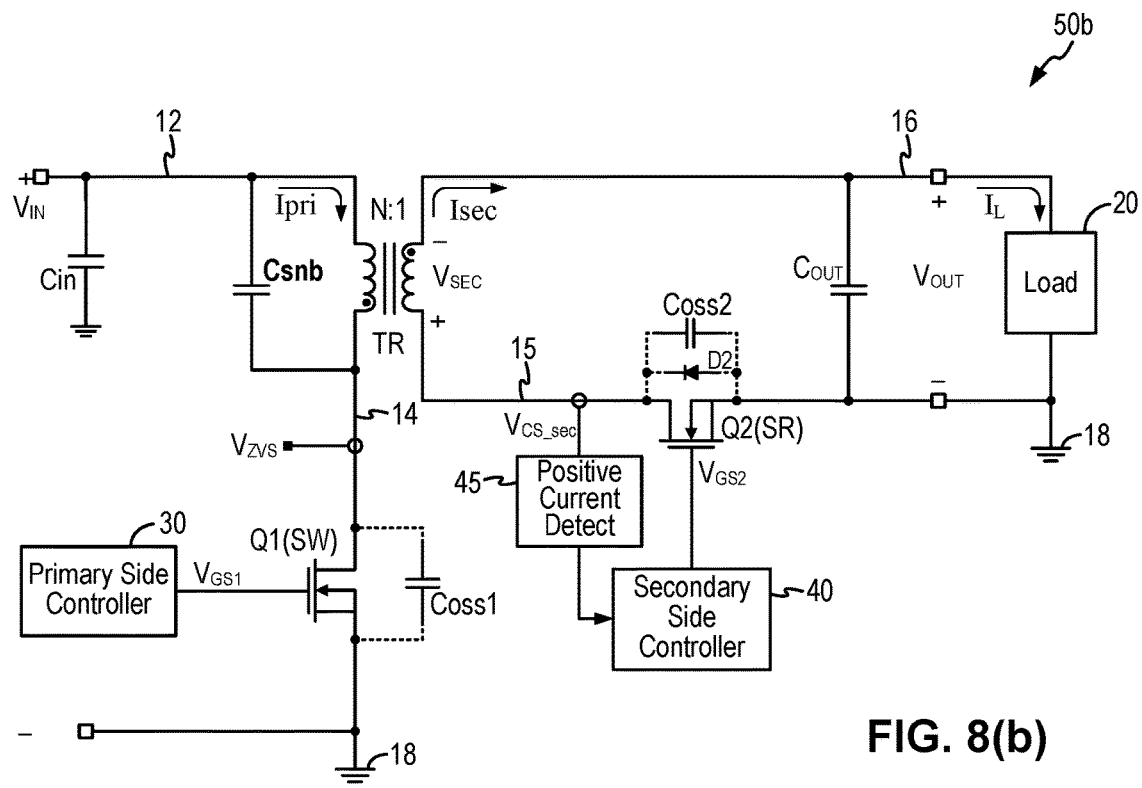
Figure 8C:
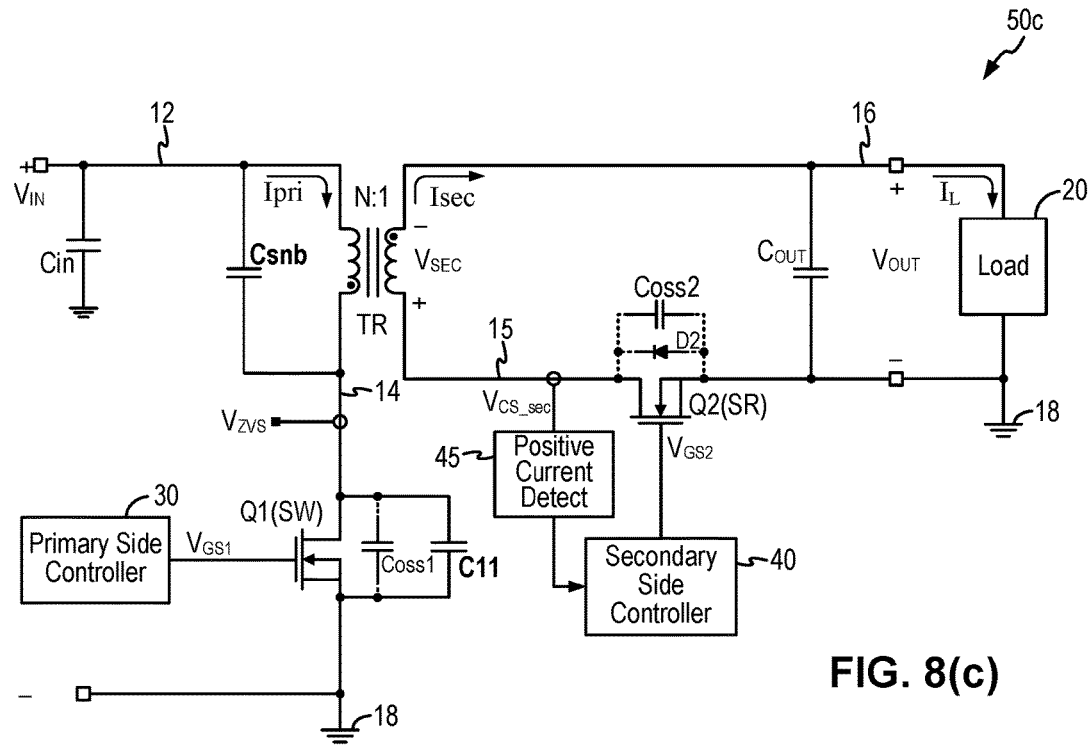

In the above described embodiments, Forced ZVS timing control is implemented to achieve zero voltage switching at the primary switch for the on-transition of the primary switch, that is, when the primary switch is to be turned on. In other embodiments, zero voltage switching can be implemented to achieve zero voltage switching at the primary switch for the off-transition of the primary switch, that is, when the primary switch is to be turned off. In embodiments of the present invention, a flyback converter can be implemented with zero voltage switching for the primary switch turn on transition and zero voltage switching for the primary switch turn off transition. FIGS. 8(a) to 8(c) are schematic diagrams of flyback converters implementing Forced Zero Voltage Switching (ZVS) timing control for the primary switch in alternate embodiments of the present invention. The flyback converters 50a-c In FIGS. 8(a)-8(c) are constructed in the same manner as the flyback converter 10 of FIG. 5 except for additional capacitor elements to implement ZVS for primary switch turn-off transition. In particular, the flyback converters 50a-c are constructed using the Forced ZVS timing control described above to achieve zero voltage switching at the primary switch for the on-transition of the primary switch. Like elements in FIGS. 5 and 8(a)-(c) are given like reference numerals and will not be further described. Referring first to FIG. 8(a), to implement zero voltage switching for the off-transition of the primary switch Q1 in the flyback converter 50a, a capacitor C11 is coupled in parallel with the primary switch Q1. That is, the capacitor C11 is connected between nodes 14 (drain of switch Q1) and 18 (ground). When the primary switch Q1 is turned on, the drain-to-source voltage Vds of the primary switch is at zero voltage. When the primary switch Q1 is to be turned off, capacitor C11 prevents the drain-to-source voltage Vds from changing instantaneously. The capacitor C11 holds the drain-to-source voltage Vds at zero voltage during the off-transition to allow the primary switch Q1 to be turned off before the drain-to-source voltage Vds changes. In this manner, zero voltage switching at primary switch turn off is achieved.

Referring now to FIG. 8(b), in other embodiments, the flyback converter 50b is implemented with a snubber capacitor Csnb coupled across the primary side of the transformer TR to implement zero voltage switching for the off-transition of the primary switch Q1. That is, the capacitor Csnb is connected between nodes 12 (input voltage Vin) and node 14 (drain terminal of primary switch). As thus configured, the snubber capacitor Csnb functions as a lossless voltage spike absorber to clamp the voltage induced by the leakage inductance of the transformer TR. Furthermore, capacitor Csnb functions to ensure zero voltage switching for both on-transition and off-transition at the primary switch Q1. During the primary switch on-transition, the energy stored in capacitor Csnb is recycled back into the input voltage node before the primary switch is turned on. During the primary switch off-transition, the capacitor Csnb operates in the same manner as capacitor C11 in FIG. 8(a) to prevent the voltage at the drain terminal (node 14) of the primary switch from switching too quickly, thereby ensuring zero voltage switching at the off-transition of the primary switch.

Finally, in the above-described embodiments, the flyback converter 50 includes either the capacitor C11 or the capacitor Csnb. In other embodiments the flyback converter can be implemented using both capacitor C11 and the capacitor Csnb. Referring to FIG. 8(c), the flyback converter 50c is constructed using both capacitor C11 and capacitor Csnb. Capacitors C11 and Csnb operate in the same manner as described above to ensure zero voltage switching during at least the off-transition of the primary switch Q1.

Figure 9:
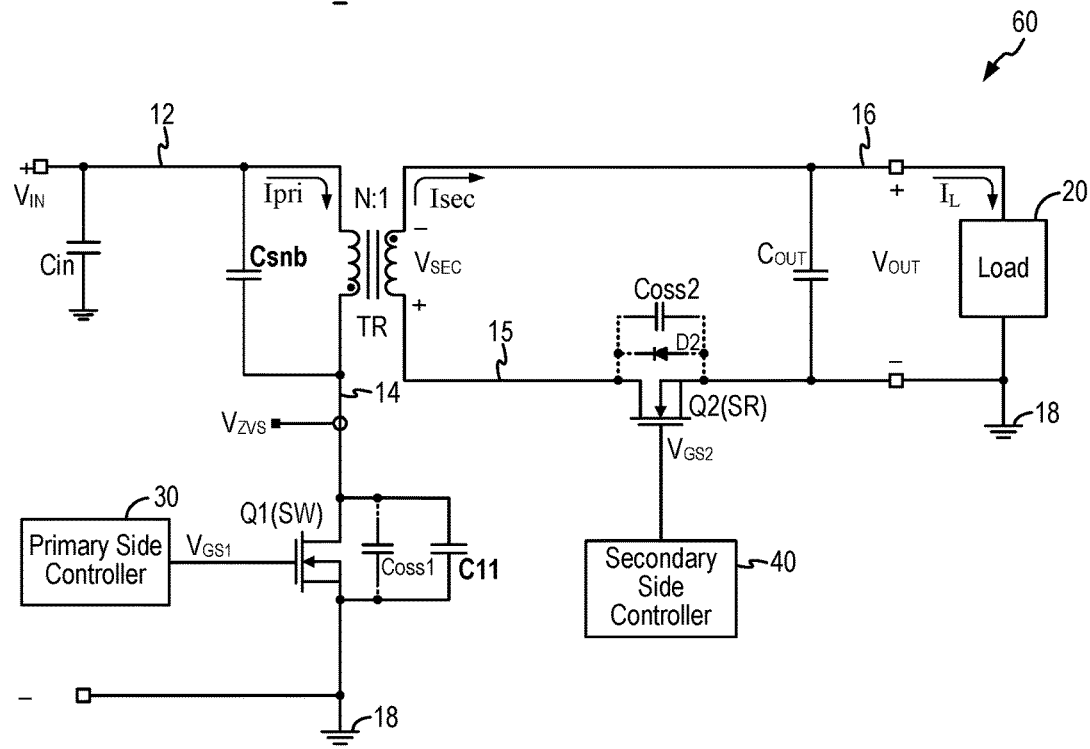
FIG. 9 is a schematic diagram of a flyback converter implementing zero voltage switching (ZVS) for the primary switch turn-off transition in embodiments of the present invention.

In the embodiments described in FIGS. 8(a) to 8(c), the flyback converters 50a-c are implemented using the Forced ZVS timing control scheme for zero voltage switching at the primary switch on-transition and using capacitor C11 or Csnb (or both) for zero voltage switching at the primary switch off-transition. In other embodiments of the present invention, a flyback converter can be implemented using any other zero voltage switching schemes for the primary switch turn on transition and using capacitor C11 or Csnb (or both) for zero voltage switching at the primary switch off-transition. FIG. 9 is a schematic diagram of a flyback converter implementing zero voltage switching (ZVS) for the primary switch turn-off transition in embodiments of the present invention. Referring to FIG. 9, the flyback converter 60 is are constructed in the same manner as the flyback converters 50a-c of FIGS. 8(a)-8(c) but without the positive current detect circuit for implementing the Forced ZVS timing control scheme described above for the primary switch turn-on transition. Instead, the flyback converter 60 can be implemented using any other zero voltage switching schemes, presently known or to be developed, to realize zero voltage switching for the primary switch turn-on transitions. For example, the flyback converter 60 can implement the variable frequency (VF) ZVS DCM scheme described by the aforementioned Zhang paper to realize zero voltage switching for the primary switch turn-on transitions.

Meanwhile, the flyback converter 60 is constructed with a capacitor C11 coupled in parallel with the primary switch Q1. The capacitor C11 holds the drain-to-source voltage Vds at zero voltage during the off-transition to allow the primary switch Q1 to be turned off before the drain-to-source voltage Vds changes. In this manner, ZVS at primary switch turn off is achieved. In the present embodiment, the flyback converter 60 is also constructed with a snubber capacitor Csnb coupled across the primary side of the transformer TR. Capacitor Csnb functions to ensure zero voltage switching for both on-transition and off-transition at the primary switch Q1. During the primary switch on-transition, the energy stored in capacitor Csnb is recycled back into the input voltage node before the primary switch is turned on. During the primary switch off-transition, the capacitor Csnb operates in the same manner as capacitor C11 to prevent the voltage at the drain terminal (node 14) of the primary switch from switching too quickly, thereby ensuring zero voltage switching at the off-transition of the primary switch.

In FIG. 9, the flyback converter 60 includes both capacitors C11 and Csnb. In other embodiments of the present invention, the flyback converter 60 can be constructed using capacitor C11 only or capacitor Csnb only to realize zero voltage switching at the primary switch at least for the off-transition of the primary switch. The use of both capacitor C11 and capacitor Csnb in FIG. 9 is illustrative only and not intended to be limiting.

As described above, the flyback converter operates with the primary switch and the synchronous rectifier being turned on and off alternately during a switching cycle. The controllers generate timing signals to synchronize the switching of the primary switch and the synchronous rectifier. For example, the primary side controller needs to be informed when the synchronous rectifier is turned off so that the primary switch can be turned on. In conventional flyback converters, opto-coupler or isolated transformer is used to control the timing signals. However, these circuit elements can be costly and consumes large circuit area.

In embodiments of the present invention, the flyback converter implements an auto synchronization method for control timing signals. During Forced ZVS operation, the synchronous rectifier is turned on for a second on-duration and then turned off. When the synchronous rectifier is turned off at the second on-duration, the secondary current is transferred through to the primary transformer winding, causing the primary current to free-wheel through the body diode D1 of the primary switch Q1. The auto synchronization method of the present invention senses the primary current to detect for the free-wheeling current after the start of the second on-duration of the synchronous rectifier. At the detection of the free-wheeling current after the start of the second on-duration of the synchronous rectifier, the auto synchronization method generates a current sense signal indicative of the synchronous rectifier being turned off. The current sense signal can be used by the primary side controller as a control timing signal to turn on the primary switch for the next switching cycle. In some embodiment, the free-wheeling current is sensed by sensing a current value above a certain threshold value.

In alternate embodiments of the present invention, the flyback converter implements output voltage sensing at the primary side of the transformer. In particular, during Forced ZVS operation, the synchronous rectifier is turned on for a second on-duration and then turned off. When the synchronous rectifier is turned on at the second on-duration, the voltage across the primary transformer winding is indicative of the output voltage Vout. Accordingly, the primary side controller can sample the voltage across the primary winding of the transformer during the second on-duration of the synchronous rectifier as an indication of the output voltage and to use the sampled voltage value to control the duty cycle of the primary switch. The output voltage sensing method of the present invention is particularly useful for voltage mode control to maintain a constant output voltage at the fly back converter output.

Figure 10:
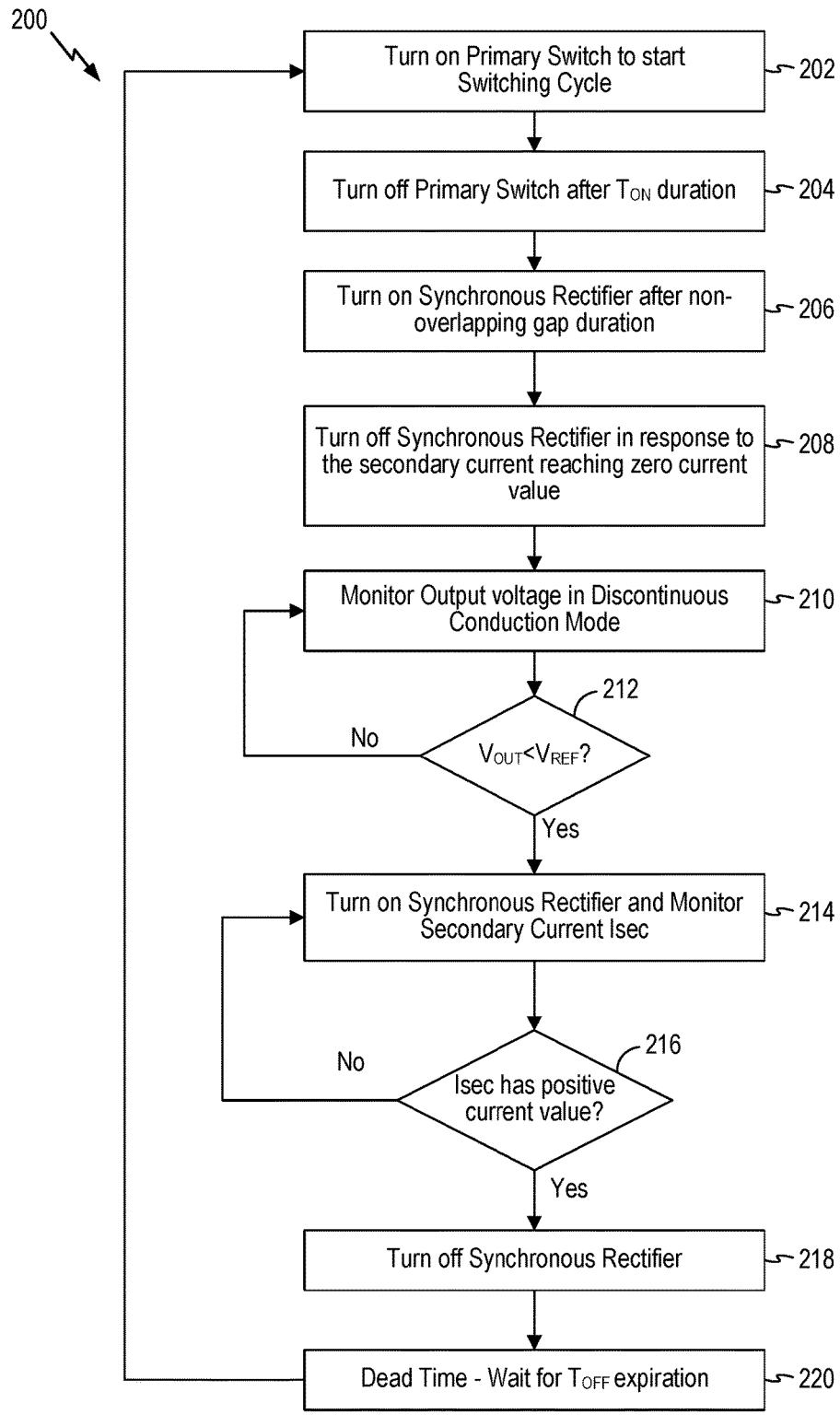
FIG. 10 is flowchart illustrating a Forced ZVS timing control method with positive current synchronous rectifier turn off trigger in embodiments of the present invention.

FIG. 10 is flowchart illustrating a Forced ZVS timing control method with positive current synchronous rectifier turn off trigger in embodiments of the present invention. The Forced ZVS method can be implemented in a flyback converter, such as the flyback converter 10 and 50 of FIGS. 5 and 8. Referring to FIG. 10, a Forced ZVS method 200 starts a switching cycle by turning on the primary switch (202). The method 200 turns off the primary switch after an on-duration $T_{ON}$ (204). The method 200 then turns on the synchronous rectifier after non-overlapping gap duration (206). The method 200 senses the secondary current and in response to the secondary current reaching a zero current value, the method 200 turns off the synchronous rectifier (208). The method 200 continues to monitor the output voltage with the flyback converter being operated in a discontinuous conduction mode (210). The method senses the output voltage $V_{OUT}$ to determine when the output voltage $V_{OUT}$ becomes less than a reference voltage $V_{REF}$ (212). When the output voltage $V_{OUT}$ is equal to or less than a reference voltage $V_{REF}$, the method 200 turns on the synchronous rectifier for a second on-duration and continues to monitor the secondary current (214). The method 200 detects when the secondary current has a positive current value (216). In response to the secondary current having a positive current value, the method 200 turns off the synchronous rectifier (218). The method 200 then waits for the expiration of the off-duration of the primary switch (220) and the next switching cycle repeats with the method 200 repeats at 202 to turn on the primary switch.

Figure 11:
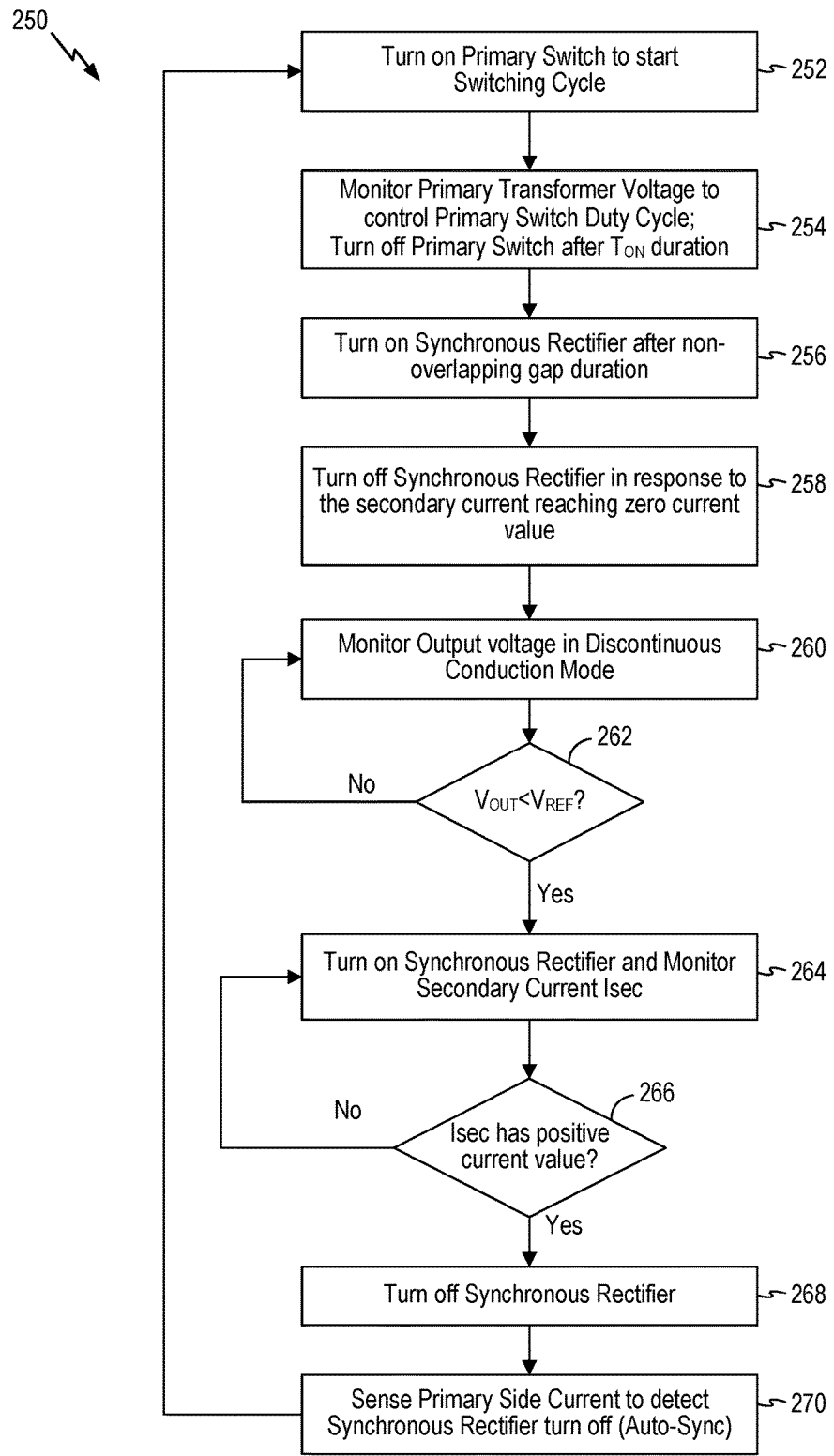
FIG. 11 is flowchart illustrating a Forced ZVS timing control method with positive current synchronous rectifier turn off trigger in an alternate embodiment of the present invention.

FIG. 11 is flowchart illustrating a Forced ZVS timing control method with positive current synchronous rectifier turn off trigger in an alternate embodiment of the present invention. In particular, FIG. 11 illustrates the use of the auto synchronization method in the Forced ZVS timing control method in embodiments of the present invention. Referring to FIG. 11, a Forced ZVS method 250 starts a switching cycle by turning on the primary switch (252). The method 250 turns off the primary switch after an on-duration $T_{ON}$ (254). The method 250 then turns on the synchronous rectifier after non-overlapping gap duration (256). The method 250 senses the secondary current and in response to the secondary current reaching a zero current value, the method 250 turns off the synchronous rectifier (258). The method 250 continues to monitor the output voltage with the flyback converter being operated in a discontinuous conduction mode (260). The method senses the output voltage $V_{OUT}$ to determine when the output voltage $V_{OUT}$ becomes less than a reference voltage $V_{REF}$ (262). When the output voltage $V_{OUT}$ is equal to or less than a reference voltage $V_{REF}$, the method 250 turns on the synchronous rectifier for a second on-duration and continues to monitor the secondary current (264). The method 250 detects when the secondary current has a positive current value (266). In response to the secondary current having a positive current value, the method 250 turns off the synchronous rectifier (268). The method 250 then senses the primary current to detect for a primary current value above a given threshold to indicate the synchronous rectifier has turned off (270). In response to the sensed primary current being above the given threshold, the method 250 repeats at 252 to turn on the primary switch for the next switching cycle.

Figure 12:
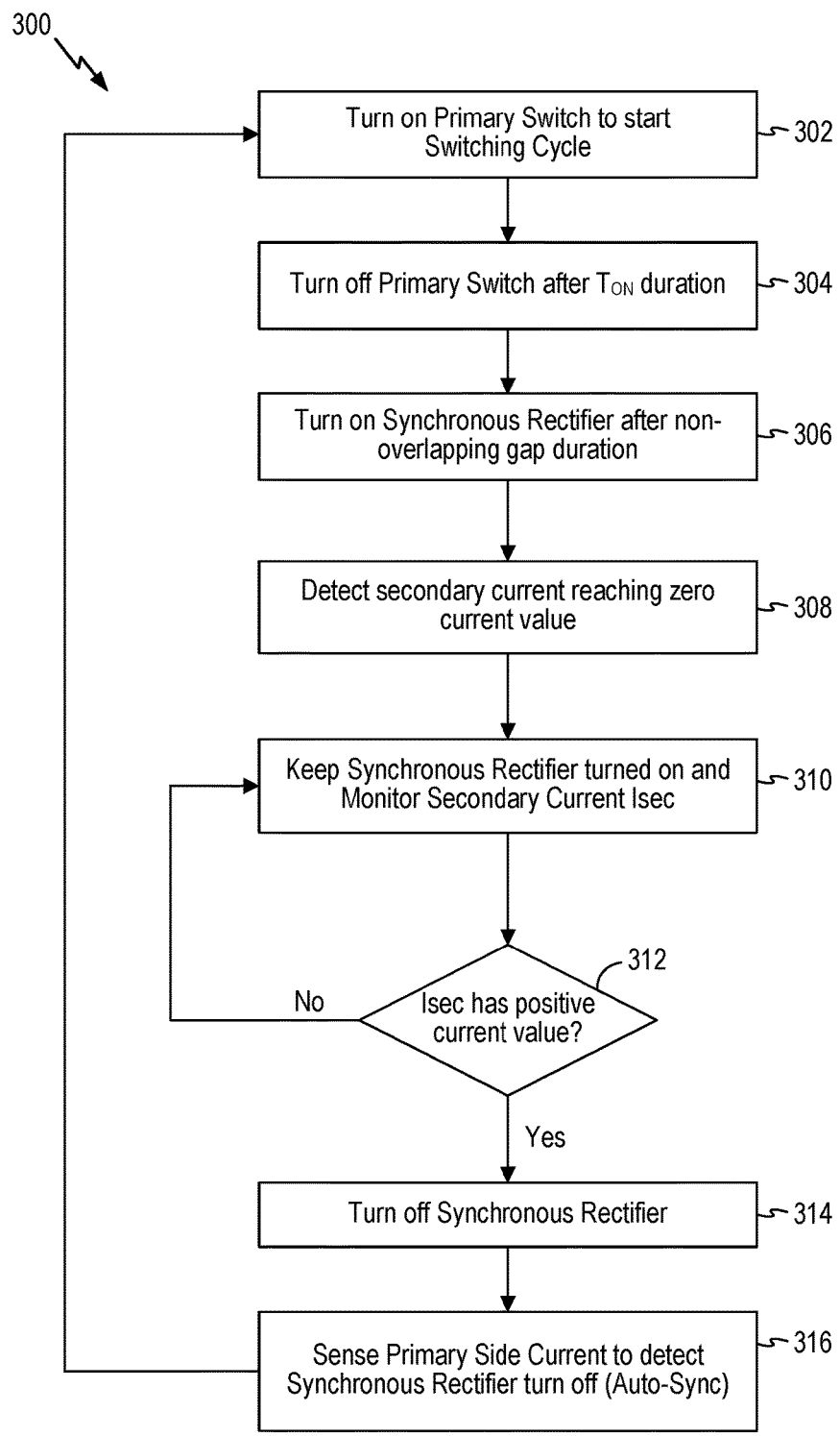
FIG. 12 is flowchart illustrating a Forced ZVS timing control method with positive current synchronous rectifier turn off trigger in alternate embodiments of the present invention.

FIG. 12 is flowchart illustrating a Forced ZVS timing control method with positive current synchronous rectifier turn off trigger in alternate embodiments of the present invention. The Forced ZVS method can be implemented in a flyback converter, such as the flyback converter 10 and 50 of FIGS. 5 and 8. Referring to FIG. 12, a Forced ZVS method 300 starts a switching cycle by turning on the primary switch (302). The method 300 turns off the primary switch after an on-duration $T_{ON}$ (304). The method 300 then turns on the synchronous rectifier after non-overlapping gap duration (306). The method 300 then detects the secondary current reaching a zero current value with the flyback converter being operated in the critical conduction mode (308). The method 300 then keeps the synchronous rectifier turned on for a second on-duration and continues to monitor the secondary current (310). The method 300 detects when the secondary current has a positive current value (312). In response to the secondary current having a positive current value, the method 300 turns off the synchronous rectifier (314). The method 300 then senses the primary current to detect for a primary current value above a given threshold to indicate the synchronous rectifier has turned off (316). In response to the sensed primary current being above the given threshold, the method 300 repeats at 302 to turn on the primary switch for the next switching cycle.

In the embodiment shown in FIG. 12, auto synchronization is implemented. In other embodiments, the Forced ZVS timing control method can be applied to a flyback converter operated in the critical conduction mode without using the auto synchronization method.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A flyback converter, comprising:
a transformer having a primary winding receiving an input voltage and a secondary winding providing an output voltage;
a primary switch coupled to the primary winding;
a synchronous rectifier coupled to the secondary winding;
an output capacitor coupled across the secondary winding;
a controller coupled to generate control signals to drive the primary switch and the synchronous rectifier; and
a positive current detect circuit configured to sense a secondary current flowing in the secondary winding and to generate a detection signal in response to detecting the secondary current having a positive current value,
wherein the controller generates a control signal to turn the primary switch and the synchronous rectifier on and off alternately within a switching cycle, the synchronous rectifier being turned on for a first on-duration within the switching cycle in response to the primary switch being turned off and the controller generates the control signal to turn off the synchronous rectifier for the first on-duration in response to detecting the secondary current reaching a zero current value and the controller continues to monitor the output voltage, and in response to the output voltage being at or less than a reference voltage, the controller generates the control signal to turn on the synchronous rectifier for a second on-duration within the switching cycle, the controller thereby operating the flyback converter in a discontinuous conduction mode.

2. The flyback converter of claim 1, wherein the positive current detect circuit senses the secondary current during the second on-duration and generate the detection signal in response to detecting the secondary current having a non-zero positive current value during the second on-duration, and in response to the detection signal, turning off the synchronous rectifier within the switching cycle.

3. The flyback converter of claim 1, wherein in response to an expiration of an off time duration of the primary switch, the controller operates the flyback converter to start the next switching cycle by repeating the turning on the primary switch, the primary switch being turned on at a zero voltage across the switch.

4. The flyback converter of claim 1, wherein the controller senses the primary current in response to the synchronous rectifier being turned on for the second on-duration, and in response to the primary current exceeding a threshold value, starting the next switching cycle by repeating the turning on of the primary switch.

5. The flyback converter of claim 1, further comprising:
a first capacitor coupled across the primary switch, wherein the primary switch is turned off at a zero voltage across the primary switch in response to the first capacitor being coupled across the primary switch.

6. The flyback converter of claim 1, further comprising:
a second capacitor coupled across the primary winding of the transformer, wherein the primary switch is turned off at a zero voltage across the primary switch in response to the second capacitor being coupled across the primary winding.

7. The flyback converter of claim 1, wherein the controller generates a control signal to turn on the primary switch for a constant on-time duration.

8. The flyback converter of claim 1, wherein the synchronous rectifier is turned on for the first on-duration after a non-overlapping period with the primary switch.

9. The flyback converter of claim 1, wherein the controller comprising a primary side controller and a secondary side controller coupled to generate control signals to drive the primary switch and the synchronous rectifier respectively.

10. The flyback converter of claim 5, further comprising:
a second capacitor coupled across the primary winding of the transformer, wherein the primary switch is turned off at a zero voltage across the primary switch in response to the first capacitor being coupled across the primary switch and in response to the second capacitor being coupled across the primary winding.

11. A flyback converter, comprising: a transformer having a primary winding receiving an input voltage and a secondary winding providing an output voltage, the primary winding having a first terminal coupled to receive the input voltage and a second terminal; a primary switch having a first terminal coupled to the second terminal of the primary winding, a second terminal coupled to a power supply voltage and a control terminal; a synchronous rectifier coupled to the secondary winding; an output capacitor coupled across the secondary winding; a controller comprising a primary side controller and a secondary side controller coupled to generate control signals to drive the primary switch and the synchronous rectifier respectively; a first capacitor coupled in parallel with across the primary switch, the first capacitor being coupled between the first terminal and the second terminal of the primary switch; and a second capacitor coupled in parallel with the primary winding of the transformer, the second capacitor being coupled between the first terminal and the second terminal of the primary winding, wherein the controller generates a control signal to turn the primary switch and the synchronous rectifier on and off alternately within a switching cycle, and wherein the primary switch is turned off at a zero voltage across the primary switch in response to the first capacitor being coupled across the primary switch and in response to the second capacitor being coupled across the primary winding, and wherein a positive current detect circuit is configured to sense a secondary current flowing in the secondary winding and to generate a detection signal in response to detecting the secondary current having a non-zero positive current value, wherein the controller generates the control signal to turn on the synchronous rectifier for a second on-duration within the switching cycle in response to detecting the secondary current reaching a zero current value, the positive current detect circuit senses the secondary current during the second on-duration and generate the detection signal in response to detecting the secondary current having the non-zero positive current value, and in response to the detection signal, the controller generates the control signal to turn off the synchronous rectifier within the switching cycle.

12. The flyback converter of claim 11, wherein the controller operates the flyback converter in a discontinuous conduction mode and the controller generates the control signal to turn off the synchronous rectifier in response to detecting the secondary current reaching a zero current value and the controller continues to monitor the output voltage, and in response to the output voltage being at or less than a reference voltage, the controller generates the control signal to turn on the synchronous rectifier for the second on-duration during the switching cycle.

13. The flyback converter of claim 11, wherein the controller operates the flyback converter in a critical conduction mode and the controller generates the control signal to extend the on-duration of the synchronous rectifier for the second on-duration within the switching cycle in response to detecting the secondary current reaching a zero current value.

14. The flyback converter of claim 11, wherein in response to an expiration of an off time duration of the primary switch, the controller operates the flyback converter to start the next switching cycle by repeating the turning on the primary switch, the primary switch being turned on at a zero voltage across the primary switch.

15. The flyback converter of claim 11, wherein the controller senses the primary current in response to the synchronous rectifier being turned on for the second on-duration, and in response to the primary current exceeding a threshold value, starting the next switching cycle by repeating the turning on of the primary switch.

16. The flyback converter of claim 11, wherein the controller generates a control signal to turn on the primary switch for a constant on-time duration.

* * * * *